US000001089H

United States Statutory Invention Registration [19]

[11] Reg. Number: H1089

D'Amato et al.

[43] Published: Aug. 4, 1992

[54] PREPARED FOOD PRODUCT

[76] Inventors: Louis D'Amato; Mara D'Amato, both of 321 Manetto Hill Rd., Plainview, N.Y. 11803

[21] Appl. No.: 626,319

[22] Filed: Dec. 13, 1990

Related U.S. Application Data

[63] Continuation of Ser. No. 495,102, Mar. 19, 1990, abandoned.

[51] Int. Cl.[5] ..... A23L 1/31
[52] U.S. Cl. ..... 426/90
[58] Field of Search ..... 426/92, 90, 297

[56] References Cited

U.S. PATENT DOCUMENTS

| | | | |
|---|---|---|---|
| 2,234,658 | 3/1941 | Smith | 426/92 |
| 2,433,622 | 12/1947 | Novak | 426/113 |
| 2,808,335 | 10/1957 | Pierce | 99/107 |
| 3,006,766 | 10/1961 | Zolezzi et al. | 426/92 |
| 3,031,310 | 4/1962 | Zolezzi et al. | 426/92 |
| 3,036,922 | 5/1962 | Saverslak | 426/92 |
| 3,038,811 | 6/1962 | Reading | 426/113 |
| 3,143,424 | 8/1964 | Wilson | 426/92 |
| 3,215,338 | 11/1965 | Schirmer | 426/113 |
| 3,285,753 | 11/1966 | Schwall | 99/107 |
| 3,300,317 | 1/1967 | Franklin | 426/92 |
| 3,594,189 | 7/1971 | Panattoni | 426/92 |
| 3,666,489 | 5/1972 | Lovell | 426/92 |
| 3,718,481 | 2/1973 | Joaquin | 426/92 |
| 3,904,772 | 9/1975 | Moegle | 426/92 |
| 4,084,493 | 4/1978 | Quintana | 426/92 |
| 4,206,241 | 6/1980 | Eberhardt | 426/291 |
| 4,313,719 | 2/1982 | Lundgren | 426/92 |
| 4,390,554 | 6/1983 | Levinson | 426/113 |
| 4,399,156 | 8/1983 | Bernal | 426/92 |
| 4,400,404 | 8/1983 | Persi | 426/92 |
| 4,438,145 | 3/1984 | Bakker | 426/92 |
| 4,687,670 | 8/1987 | Rodriguez | 426/297 |
| 4,849,232 | 7/1989 | Baker et al. | 426/92 |
| 4,867,995 | 9/1989 | Oaks | 426/113 |

FOREIGN PATENT DOCUMENTS

| | | | |
|---|---|---|---|
| 1918996 | 10/1970 | Fed. Rep. of Germany | 426/92 |
| 46-29184 | 8/1971 | Japan | 426/92 |
| 63-237762 | 10/1988 | Japan | 426/92 |
| 63-251067 | 10/1988 | Japan | 426/92 |

*Primary Examiner*—Richard D. Lovering
*Assistant Examiner*—Joseph D. Anthony
*Attorney, Agent, or Firm*—Terry M. Gernstein

[57] ABSTRACT

A prepared food product includes a chicken breast that is cut in butterfly shrimp fashion and wrapped about a specially prepared stuffing mixture and then encased in an outer element, such as aluminum foil, or the like. The food product can be stored and then used in a variety of cooking styles.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PREPARED FOOD PRODUCT

This is a continuation of copending application Ser. No. 07/495,102, filed on Mar. 19, 1990, now abandoned.

TECHNICAL FIELD OF THE INVENTION

The present invention relates to the general art of cooking and food products, and to the particular field of partially prepared food products.

BACKGROUND OF THE INVENTION

With many families having both spouses working, or with only a single parent, or the like, modern food preparation often requires convenience and speed. However, such requirements have often been achieved at the expense of flavor, cost and variety.

Thus, the art has included many read-to-eat food items, items which are simple re-heated or the like. While successful, these items have several drawbacks that still may inhibit their attaining even greater commercial success.

For example, the taste and quality of many of these items is often sacrificed so the item can be frozen for storage. Such items also lose taste and consistency during storage. Thus, the ultimate product consumed can be less than originally envisioned.

Still further, many of these products contain large amounts of animal fat, sodium and the like in order to enhance their storage characteristics. As has been documented, ingredients such as animal fat, sodium and the like are not always desirable.

Still further, many of these products are not amenable to variations in cooking and serving style, such as French, Creole, Italian, or the like. Thus, the product is limited and the consumer is liable to become bored with the product.

Due to such lack of versatility, many presently-available partially prepared food products are not used by restaurants, institutions or the like since the overall product will be limited to one or two basic styles. Many restaurants want a basic product which can be altered and customized by their own chef.

Therefore, there is a need for a food product that can be prepared by a simple and quick heating process, yet is low in sodium and animal fat, and is also amenable to variations in serving and cooking style.

OBJECTS OF THE INVENTION

It is a main object of the present invention is to provide a food product that can be prepared by a simple and quick heating process.

It is another object of the present invention to provide a food product that can be prepared by a simple and quick heating process, yet is low in sodium and animal fat.

It is another object of the present invention to provide a food product that can be prepared by a simple and quick heating process, yet is low in sodium and animal fat, and is also ameneable to variations in serving and cooking style.

SUMMARY OF THE INVENTION

These, and other, objects are achieved by a food product that includes chicken, vegetables, stuffing and spices wrapped in a covering that is suitable for oven heating or another covering that is suitable for microwave heating. The food product is designed to be low in sodium and cholesterol.

The standard version of the food product includes boneless chicken breast rolled into a cylindrical shape, filled with a stuffing and sauce mixture. The boneless chicken breast is cut in a fashion similar to the "butterfly" method of cutting shrimp, thus increasing the surface area and decreasing the required cooking and freezing time.

The stuffing contains onions, carrots, garlic, celery and parsley, mushrooms, cubed chicken meat, egg whites, black pepper, and poultry seasoning. These items are sauteed together. A sauce, which can be dehydrated, can be packaged separately from the chicken for optional use.

The chicken servings are then prepared for cooking and packaging by placing the chicken breasts skin-side down onto a piece of aluminum foil, or other suitable material, spreading the stuffing mixture on top of the chicken, leaving one inch on each edge and rolling the chicken up in "jelly roll" fashion.

The fillings are varied to be herbed, Mexican, Chinese, Italian, Creole, French,. Other items such as beef, veal or pork, or the like can be used to enhance the marketability of the product.

The product is especially suitable for storage and later use because a dehydrated sauce can be used. Thus, the product can be packaged for storage and later use by simple microwave or oven heating.

BRIEF DESCRIPTION OF THE DRAWING FIGURES

DETAILED DESCRIPTION OF THE PREFERRED EMBODIMENT OF THE INVENTION

Figure 1:
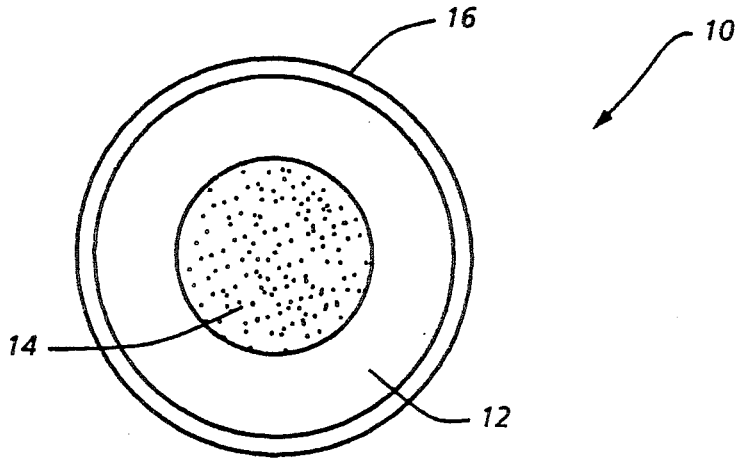
FIG. 1 is an end elevational view of the food product embodying the present invention.
Figure 2:
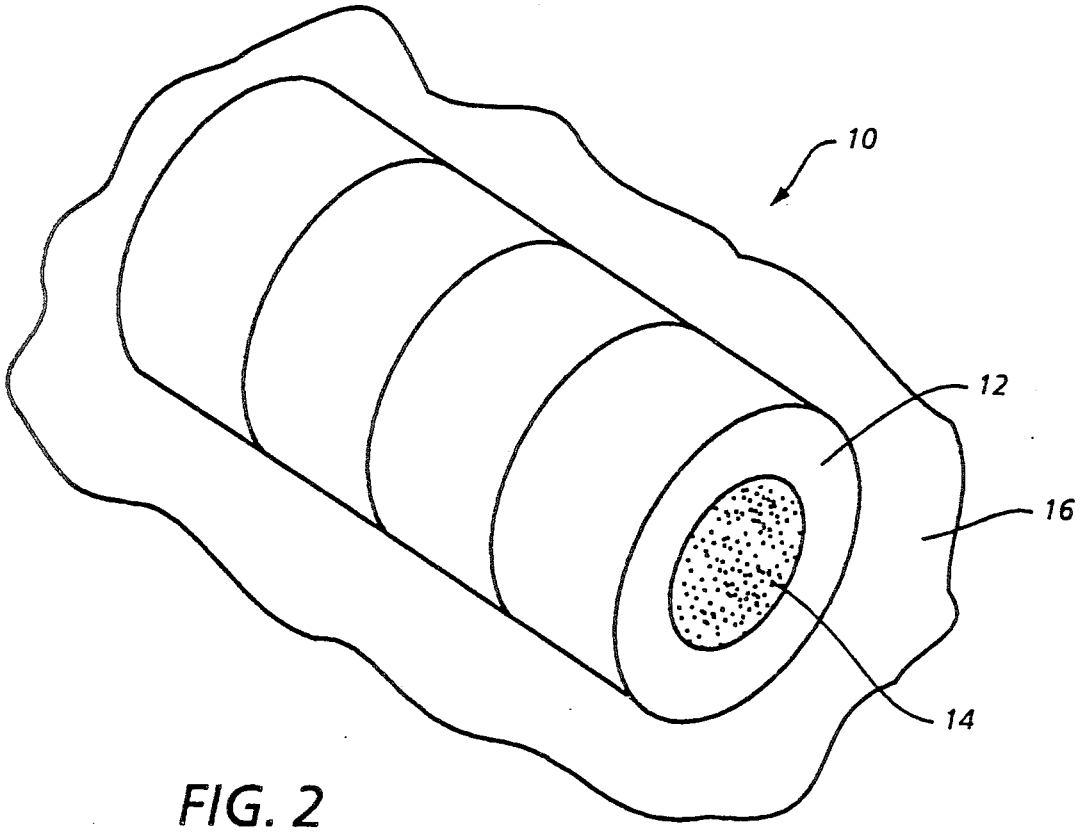
FIG. 2 is a perspective view of the food product.

The overall product 10 is shown in FIGS. 1 and 2 as including a boneless chicken breast that has been rolled into an outer layer 12 which contains a filling 14. A wrapping 16, such as aluminum foil or microwaveable material, or the like is wrapped about the product, and the product can be stored for sale in a supermarket or the like, stored and later used. The consumer can prepare the product by any of a variety of different methods, such as oven preparation, microwave preparation, barbecue, baking or even poaching. Various dehydrated sauces can be sold in conjunction with the food product to give it a distinctive flavor, such as French, Oriental, Mexican, Italian, Creole, or the like, and the overall product can be prepared in as little as five to seven minutes.

Specifically, six servings of the food product 10 are prepared as follows.

The chicken outer layer 12 is prepared by cutting six boneless chicken breasts in "butterfly" shrimp fashion, spreading each of the cut chicken breasts, skin side down on top of a portion of outer wrapping which is sized to be double the size of the chicken breast.

The filling 14 for the six chicken breasts is prepared by combining three ounces of minced onions which have been sauteed over a medium heat until all of the onions are translucent, one and one-half ounces of mashed garlic cloves, three ounces of minced carrots, one ounce of minced celery and one ounce of chopped parsley. The filling is then completed by pureeing together Two and one-half ounces of mushrooms, three ounces of cubed chicken meat, three egg whites, a pinch of black pepper and one teaspoon of poultry seasoning while all are worked together. The pureed portion is then mixed together with the first portion.

The product is then completed by spreading the combined products on top of the chicken breasts leaving about one inch margin on all sides and rolling the covered chicken breasts up in a "jelly roll fashion", or cylindrical shape as shown in FIG. 2. The ends of the outer wrapper are then twisted to tighten the rolled product into a cylindrical shape shown in FIG. 2.

The wrapped product is then cooked by pre-heating an oven to 375° F., placing the wrapped product on a pan and baking for ten to twelve minutes.

A cooked chicken is then removed for cutting. The chicken can be cut at an angle or left in place for a consumer to cut. Further sauce can be added to vary the tastes as desired. Various ingredients can be added to the filling to vary the style, such as Herbed, Mexican, Chinese, Italian, French or the like.

It is understood that while certain forms of the present invention have been illustrated and described herein, it is not to be limited to the specific forms or arrangements of parts described and shown.

We claim:

1. A method of preparing a food product comprising steps of:

A) providing an outer wrapping element;

B) cutting a chicken breast in butterfly shrimp fashion and placing said cut chicken breast skin-side down on said outer wrapping element;

C) preparing a first stuffing portion by (1) sauteing onions until said onions are translucent, (2) mashing garlic cloves, (3) mincing carrots, (4) mincing celery, (5) chopping parsley, and (6) combining said sauteed onions, said mashed garlic cloves, said minced carrots, said minced celery and said chopped parsley;

D) preparing a second stuffing portion by (1) providing mushrooms, (2) providing cubed chicken meat, (3) providing black pepper, (4) providing poultry seasoning, (5) pureeing all of said mushrooms, said cubed chicken meat, said black pepper and said poultry seasoning together, and (6) providing egg whites for binding;

E) combining said first and second stuffing portions together by mixing said first and second stuffing portions together;

F) spreading said combined stuffing portions onto said chicken breast and leaving a one-inch border on all sides of said chicken breast;

G) rolling up said chicken breast with said combined stuffing portions thereon in jelly roll fashion into a cylindrical tube; and H) wrapping said outer wrapping element about said cylindrical tube, and twisting the ends of said outer wrapping element closed.

2. The method of preparing a food product defined in claim 1 further including a step of cooking said wrapped tube by preheating an oven, placing said wrapped cylindrical element on a pan, and baking said wrapped cylindrical element on said pan.

3. The method of preparing a food product defined in claim 2 further including a step of removing said outer wrapping element from said cooked wrapped cylindrical tube, and cutting said rolled chicken breast.

4. The method of preparing a food product defined in claim 3 wherein said step of preparing said first stuffing portion includes steps of providing three ounces of minced onions, one and one-half ounces of mashed garlic cloves, three ounces of minced carrots, one ounce of minced celery, and one ounce of chopped parsley.

5. The method of preparing a food product defined in claim 4 wherein said step of preparing said second stuffing portion includes steps of providing Two and one-half ounces of mushrooms, three ounces of cubed chicken meat, three ounces of egg whites, and one teaspoon of poultry seasoning.

6. The method of preparing a food product defined in claim 5 wherein said boarder is approximately one inch wide.

7. The method of preparing a food product defined in claim 6 wherein said cooking step includes preheating an oven to approximately three hundred seventy five degrees F., and baking for approximately ten to twelve minutes.

8. A food product prepared in accordance with the method defined in claim 6.

* * * * *